US010242468B2

(12) United States Patent
Asadi et al.

(10) Patent No.: US 10,242,468 B2
(45) Date of Patent: Mar. 26, 2019

(54) SPATIAL FILTER FOR GEO-ENRICHED DATA

(71) Applicant: SAP SE, Walldorf (DE)

(72) Inventors: Mohsen Asadi, Vancouver (CA); Lyndon Hiew, Richmond (CA); Christopher Bolognese, Vancouver (CA); Christopher Tam, Vancouver (CA); Sae-Won Om, Vancouver (CA)

(73) Assignee: SAP SE, Walldorf (DE)

( * ) Notice: Subject to any disclaimer, the term of this patent is extended or adjusted under 35 U.S.C. 154(b) by 35 days.

(21) Appl. No.: 15/343,385

(22) Filed: Nov. 4, 2016

(65) Prior Publication Data

US 2018/0130237 A1    May 10, 2018

(51) Int. Cl.
*G06T 17/05* (2011.01)
*G06F 17/30* (2006.01)
*G06T 11/20* (2006.01)
*G06T 7/60* (2017.01)

(52) U.S. Cl.
CPC ........ *G06T 11/20* (2013.01); *G06F 17/30241* (2013.01); *G06T 7/60* (2013.01); *G06T 2215/16* (2013.01)

(58) Field of Classification Search
CPC ....... G06T 11/001; G06T 11/60; G06T 15/30; G06T 17/05; G06F 17/30463; G06F 17/30864; G06F 17/3087; G06F 7/24; G06F 17/30867; G06F 17/30241; G06F 17/17; G06F 17/30277; G06F 17/30386; G06F 17/30389; G06F 17/30395; G06F 17/30554; G06F 17/30646; G06F 17/30696; H04L 29/08072
USPC ......... 345/581, 619, 620; 382/113; 707/713, 707/722, 723, 724, 752, 754; 709/203, 709/219
See application file for complete search history.

(56) References Cited

U.S. PATENT DOCUMENTS

| 2011/0213634 A1* | 9/2011 | Karakey | G06Q 10/06 |
| | | | 705/7.14 |
| 2013/0332877 A1* | 12/2013 | Florance | G06Q 10/10 |
| | | | 715/781 |

* cited by examiner

*Primary Examiner* — Ke Xiao
*Assistant Examiner* — Andrew Shin
(74) *Attorney, Agent, or Firm* — Fountainhead Law Group P.C.

(57) ABSTRACT

Some embodiments provide a non-transitory machine-readable medium that stores a program. The program sends a second computing system a spatial filter and a first query for a first set of geo-enriched data associated with a spatial visualization. The program further sends the second computing system the spatial filter and a second query for a second set of geo-enriched data associated with a non-spatial visualization. The program also receives, from the second computing system, a subset of the first set of geo-enriched data. The program further receives, from the second computing system, a subset of the second set of geo-enriched data. The program also generates the spatial visualization to include the subset of the first set of geo-enriched data. The program further generates the non-spatial visualization to include the subset of the second set of geo-enriched data.

20 Claims, 16 Drawing Sheets

SPATIAL FILTER FOR GEO-ENRICHED DATA

BACKGROUND

Computing systems and computing devices of today are generating and storing an increasing amount of data. The data may contain information that becomes meaningful once the data is processed. One way to provide meaning to the data is to process the data and present the data in visualizations. Examples of visualizations include histograms, pie charts, scatter plots, cartograms, choropleths, dot distribution maps, matrices, etc. Different visualizations may present different information. For example, one visualization may present revenue sales data, another visualization may present population density data, yet another visualization may present store location data, etc.

SUMMARY

In some embodiments, a non-transitory machine-readable medium stores a program. The program sends a second computing system a spatial filter and a first query for a first set of geo-enriched data associated with a spatial visualization. The program further sends the second computing system the spatial filter and a second query for a second set of geo-enriched data associated with a non-spatial visualization. The program also receives, from the second computing system, a subset of the first set of geo-enriched data. The program further receives, from the second computing system, a subset of the second set of geo-enriched data. The program also generates the spatial visualization to include the subset of the first set of geo-enriched data. The program further generates the non-spatial visualization to include the subset of the second set of geo-enriched data.

In some embodiments, the program further displays the spatial visualization and the non-spatial visualization on a display of the first computing system. Spatial filter may be a geometry of a geographical element in the map visualization. In some embodiments, the spatial visualization includes a tool for specifying a geometry in the spatial visualization. The spatial filter may be a geometry in the map visualization defined via the tool.

In some embodiments, the spatial visualization includes a set of geographical elements. The spatial filter may be a distance filter that filters for geo-enriched data that is within a defined distance to the set of geographical elements in the spatial visualization. The subset of the first set of geo-enriched data may be a first subset of the first set of geo-enriched data and the subset of the second set of geo-enriched data may be a first subset of the second set of geo-enriched data. The program further receives a modification to the spatial filter. In response to the modification, the program may send the second computing system the modified spatial filter and the first query for the first set of geo-enriched data associated with the spatial visualization and send the second computing system the modified spatial filter and the second query for the second set of geo-enriched data associated with the non-spatial visualization. In response to the modification, the program may also receive, from the second computing system, a second subset of the first set of geo-enriched data and receive, from the second computing system, a second subset of the second set of geo-enriched data. In response to the modification, the program may further generate the spatial visualization to include the second subset of the first set of geo-enriched data and generate the non-spatial visualization to include the second subset of the second set of geo-enriched data.

In some embodiments, the spatial filter is a first spatial filter. Sending the second computing system the spatial filter and the first query may include sending the second computing system the first spatial filter, a second spatial filter, and the first query. Sending the second computing system the spatial filter and the second query may include sending the second computing system the first spatial filter, the second spatial filter, and the second query.

In some embodiments, for a method performed by a first computing system, the method sends a second computing system a spatial filter and a first query for a first set of geo-enriched data associated with a spatial visualization. The method further sends the second computing system the spatial filter and a second query for a second set of geo-enriched data associated with a non-spatial visualization. The method also receives, from the second computing system, a subset of the first set of geo-enriched data. The method further receives, from the second computing system, a subset of the second set of geo-enriched data. The method also generates the spatial visualization to include the subset of the first set of geo-enriched data. The method further generates the non-spatial visualization to include the subset of the second set of geo-enriched data.

In some embodiments, the method further displays the spatial visualization and the non-spatial visualization on a display of the first computing system. The spatial filter may be a geometry of a geographical element in the map visualization. In some embodiments, the spatial visualization includes a tool for specifying a geometry in the spatial visualization. The spatial filter may be a geometry in the map visualization defined via the tool.

In some embodiments, the spatial visualization includes a set of geographical elements. The spatial filter may be a distance filter that filters for geo-enriched data that is within a defined distance to the set of geographical elements in the spatial visualization. The subset of the first set of geo-enriched data may be a first subset of the first set of geo-enriched data and the subset of the second set of geo-enriched data may be a first subset of the second set of geo-enriched data. The method further receives a modification to the spatial filter. In response to the modification, the method may send the second computing system the modified spatial filter and the first query for the first set of geo-enriched data associated with the spatial visualization and send the second computing system the modified spatial filter and the second query for the second set of geo-enriched data associated with the non-spatial visualization. In response to the modification, the method may also receive, from the second computing system, a second subset of the first set of geo-enriched data and receive, from the second computing system, a second subset of the second set of geo-enriched data. In response to the modification, the method may further generate the spatial visualization to include the second subset of the first set of geo-enriched data and generate the non-spatial visualization to include the second subset of the second set of geo-enriched data.

In some embodiments, the spatial filter is a first spatial filter. Sending the second computing system the spatial filter and the first query may include sending the second computing system the first spatial filter, a second spatial filter, and the first query. Sending the second computing system the spatial filter and the second query may include sending the second computing system the first spatial filter, the second spatial filter, and the second query.

In some embodiments, a system includes a set of processing units and a non-transitory computer-readable medium that stores instructions. The instructions cause at least one processing unit to send a computing system a spatial filter and a first query for a first set of geo-enriched data associated with a spatial visualization. The instructions further cause the at least one processing unit to send the computing system the spatial filter and a second query for a second set of geo-enriched data associated with a non-spatial visualization. The instructions also cause the at least one processing unit to receive, from the computing system, a subset of the first set of geo-enriched data. The instructions further cause the at least one processing unit to receive, from the computing system, a subset of the second set of geo-enriched data. The instructions also cause the at least one processing unit to generate the spatial visualization to include the subset of the first set of geo-enriched data. The instructions further cause the at least one processing unit to generate the non-spatial visualization to include the subset of the second set of geo-enriched data.

In some embodiments, the instructions further cause the at least one processing unit to display the spatial visualization and the non-spatial visualization on a display of the system. The spatial filter may be a geometry of a geographical element in the map visualization. In some embodiments, the spatial visualization includes a tool for specifying a geometry in the spatial visualization. The spatial filter may be a geometry in the map visualization defined via the tool.

In some embodiments, the spatial visualization includes a set of geographical elements. The spatial filter may be a distance filter that filters for geo-enriched data that is within a defined distance to the set of geographical elements in the spatial visualization. The subset of the first set of geo-enriched data may be a first subset of the first set of geo-enriched data and the subset of the second set of geo-enriched data may be a first subset of the second set of geo-enriched data. The instructions further cause the at least one processing unit to receive a modification to the spatial filter. In response to the modification, the instructions may cause the at least one processing unit to send the second computing system the modified spatial filter and the first query for the first set of geo-enriched data associated with the spatial visualization and send the second computing system the modified spatial filter and the second query for the second set of geo-enriched data associated with the non-spatial visualization. In response to the modification, the instructions may also cause the at least one processing unit to receive, from the second computing system, a second subset of the first set of geo-enriched data and receive, from the second computing system, a second subset of the second set of geo-enriched data. In response to the modification, the instructions may further cause the at least one processing unit to generate the spatial visualization to include the second subset of the first set of geo-enriched data and generate the non-spatial visualization to include the second subset of the second set of geo-enriched data.

The following detailed description and accompanying drawings provide a better understanding of the nature and advantages of the present invention.

DETAILED DESCRIPTION

Figure 1:
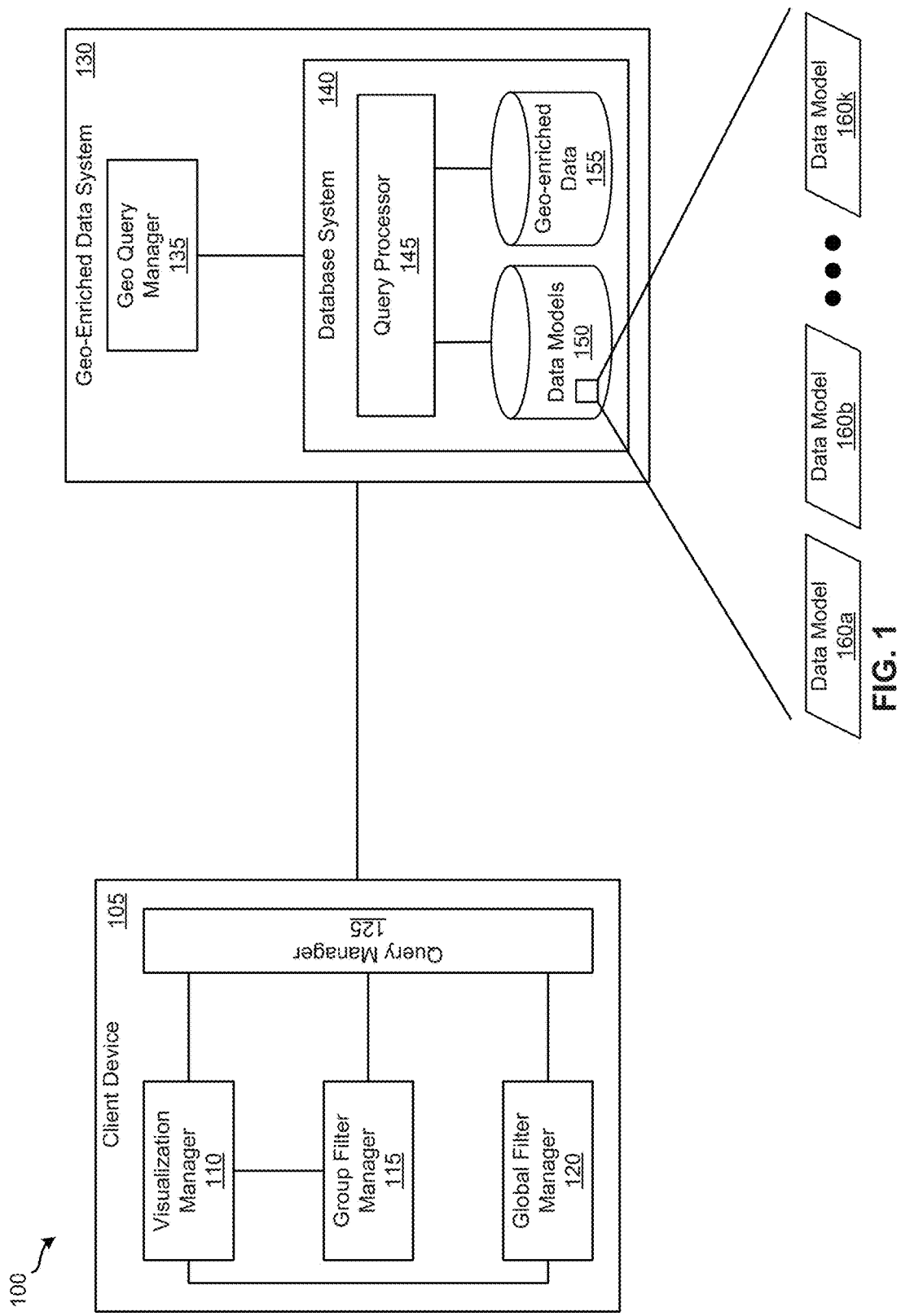
FIG. 1 illustrates a system that includes a client device according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for managing spatial filters used to query for geo-enriched data for different visualizations. In some embodiments, a client device is configured to generate and display spatial visualizations that include geo-enriched data and non-spatial visualizations that include geo-enriched data. To obtain geo-enriched data for such visualizations, the client device may send a geo-enriched data system different queries for geo-enriched data for the different visualizations along with one or more spatial filters. The geo-enriched data system processes the queries based on the spatial filters and returns to the client device different query results for the different visualizations. The client device then generates the different visualizations using the different query results.

In some embodiments, a spatial filter may be defined as having one of several different scopes. For example, a spatial filter may be defined as a local filter, which is applied to a visualization for which the spatial filter is created. A spatial filter may be defined as a group filter, which is applied to two or more specified visualizations. A spatial may also be defined as a global filter, which is applied to all visualizations. In some embodiments, when a spatial filter is modified, the client device updates the visualizations associated with the spatial filter. This way, the visualizations associated with the spatial filter may be updated to include geo-enriched data filtered by the modified spatial filter.

In some embodiments, a spatial visualization is a visualization that illustrates relationships among elements in a defined space. An example of a spatial visualization is a map visualization. In some embodiments, a non-spatial visualization is a visualization that does not depict relationships among elements in a defined space. Examples of non-spatial visualizations include charts, graphs, tables, etc.

In some embodiments, geo-enriching data is associating non-location data with spatial data. For instance, data that includes non-location and location data associated with the non-location data may be geo-enriched by geocoding the location data. In some embodiments, geocoding location data is converting the location data to spatial data. In some embodiments, location data is data that describes a location, area, region, or combination thereof (e.g., a location, area, region, or combination thereof on Earth). Examples of location data may include address data, city data, state data, country data, postal zip code data, latitude and longitude data, etc., or a combination of any number of different types of location data (e.g., address data and city data, city data and state data, address data, etc.). In some embodiments, location data is textual data.

Spatial data may be data that defines the shape, size, position, and/or orientation of a geometry (e.g., a point, a line, an area, a region, or any combination thereof) in a defined space (e.g., the surface of the Earth). In some embodiments, a defined space in which geometries are defined is referred to as a spatial reference system (SRS). A particular defined space may be associated with a unique identifier referred to as a spatial reference identifier (SRID). Spatial data may be represented using a particular spatial data type (e.g., a point represented as an ST_point, a line represented as an ST_curve, an area represented as an ST_polygon, etc.). Spatial operations may be performed on spatial data such as calculating the intersection of spatial data (e.g., intersection of two polygons), determining whether spatial data (e.g., a point, a line, a polygon, or any combination therefore) is contained within another spatial data (e.g., a polygon), etc.

FIG. 1 illustrates a system 100 that includes a client device according to some embodiments. As shown, system 100 includes client device 105 and geo-enriched data system 130. Client device 105 is configured to generate and display visualizations that include geo-enriched data on a display of client device 105. In addition, client device 105 is configure to access and communicate with geo-enriched data system 130 (e.g., via a network) in order to obtain geo-enriched data for the visualizations. As illustrated, client device 105 includes visualization manager 110, group filter manager 115, global filter manager 120, and query manager 125. In some embodiments, visualization manager 110, group filter manager 115, global filter manager 120, and query manager 125 may be implemented in an application (e.g., a web browser) operating on client device 105.

Visualization manager 110 is responsible for managing visualizations (e.g., spatial visualizations and non-spatial visualizations) for client device 105. For instance, visualization manager 110 may receive (e.g., from a user of client device 105) a request to create a visualization and geo-enriched data associated with the visualization. In response to such a request, visualization manager 110 generates a unique identifier (e.g., a visualization ID) associated with the visualization and generates a query for the geo-enriched data associated with the visualization. To generate or update a visualization, visualization manager 110 sends query manager 125 a visualization ID associated with the visualization and a query for geo-enriched data associated with the visualization. In return, visualization 110 receives geo-enriched data from query manager 125. Visualization manager 110 then generates the visualization that includes the geo-enriched data.

Figures 2, 3:
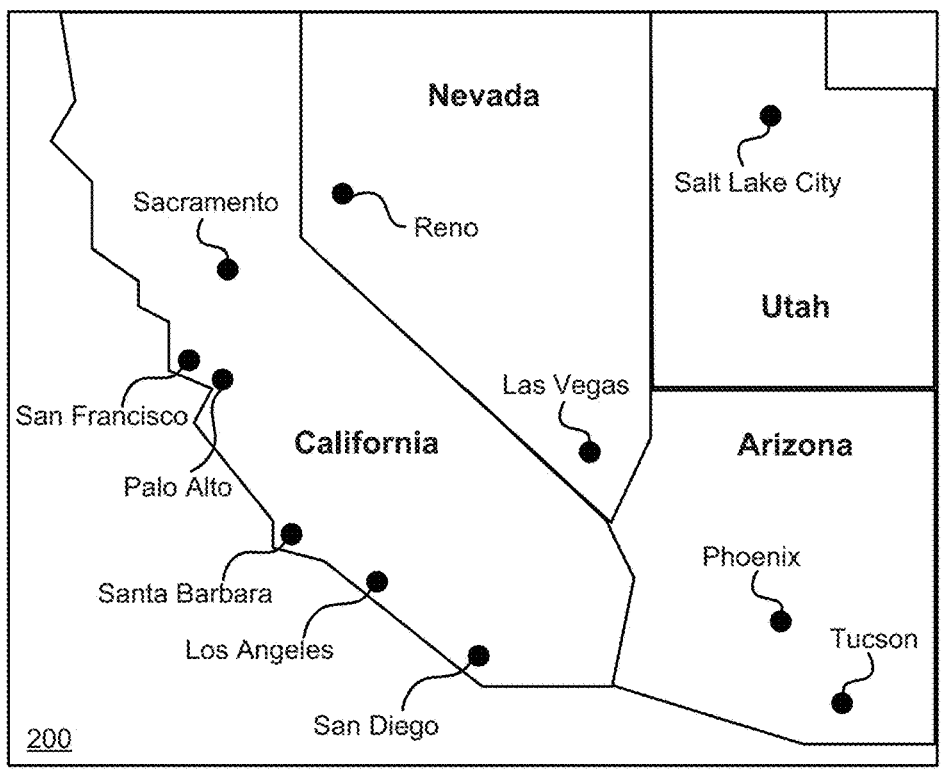
FIG. 2 illustrates an example map visualization that includes geo-enriched data according to some embodiments.
FIG. 3 illustrates an example chart visualization that includes geo-enriched data according to some embodiments.

Visualization manager 110 is configured to manage the different queries for geo-enriched data associated with different visualizations. Each visualization has a query associated with the visualization that is configured to query for geo-enriched data to be included in the visualization. This way, different visualizations may include different geo-enriched data. For example, FIG. 2 illustrates an example map visualization 200 that includes geo-enriched data according to some embodiments. In this example, map visualization 200 includes the geographical locations of stores in the states of California, Nevada, Utah, and Arizona. In particular, California has stores located in San Francisco, Palo Alto, Los Angeles, Santa Barbara, and San Diego. Nevada has stores located in Reno and Las Vegas. Utah has a store located in Salt Lake City. Finally, Arizona has stores located in Phoenix and Tucson. As another example, FIG. 3 illustrates an example chart visualization 300 that includes geo-enriched data according to some embodiments. As illustrated, chart visualization 300 includes the store sales value associated with each of the stores illustrated in FIG. 2. Specifically, the San Francisco store has a store sales value of 43292, the Los Angeles store has a store sales value of 40879, the Palo Alto store has a store sales value of 38915, the Phoenix store has a store sales value of 36328, the Las Vegas store has a store sales value of 31699, the San Diego store has a store sales value of 31124, the Sacramento store has a store sales value of 26111, the Salt Lake City store has a store sales value of 25687, the Santa Barbara store has a store sales value of 21919, the Reno store has a store sales value of 20357, and the Tucson store has a store sales value of 18499.

FIG. 2 shows an example of a spatial visualization that include geo-enriched data while FIG. 3 shows an example of a non-spatial visualization that include geo-enriched data. In some embodiments, visualization manager 110 generates and displays on a display of client device 105 one or more spatial visualizations (e.g., map visualization 200) as well as and one or more non-spatial visualizations (e.g., chart visualization 300). One of ordinary skill in the art will understand that visualization manager 110 may generate and display any number of additional and/or different spatial and/or non-spatial visualizations.

In some embodiments, the geo-enriched data used in the different visualizations is data from the same data model. In some embodiments, a data model is a representation of data (e.g., business data) associated with an organization or business segment. Data models may be the basis for the output of data.

In some instances, a user of client device 105 may define and request to create a spatial filter for a visualization. In some such instances, when visualization manager 110 receives the request to create a spatial filter, visualization manager 115 creates a spatial filter according to the definition of the spatial filter. In some embodiments, a spatial filter definition specifies a unique identifier associated with the spatial filter, a type of spatial filter, spatial parameters associated with the type of spatial filter, a filter scope, a defined space (e.g., an SRID of a defined space) in which the spatial filter is defined, a negation option, and a spatial attribute on which the spatial filter is applied.

Figure 4A:
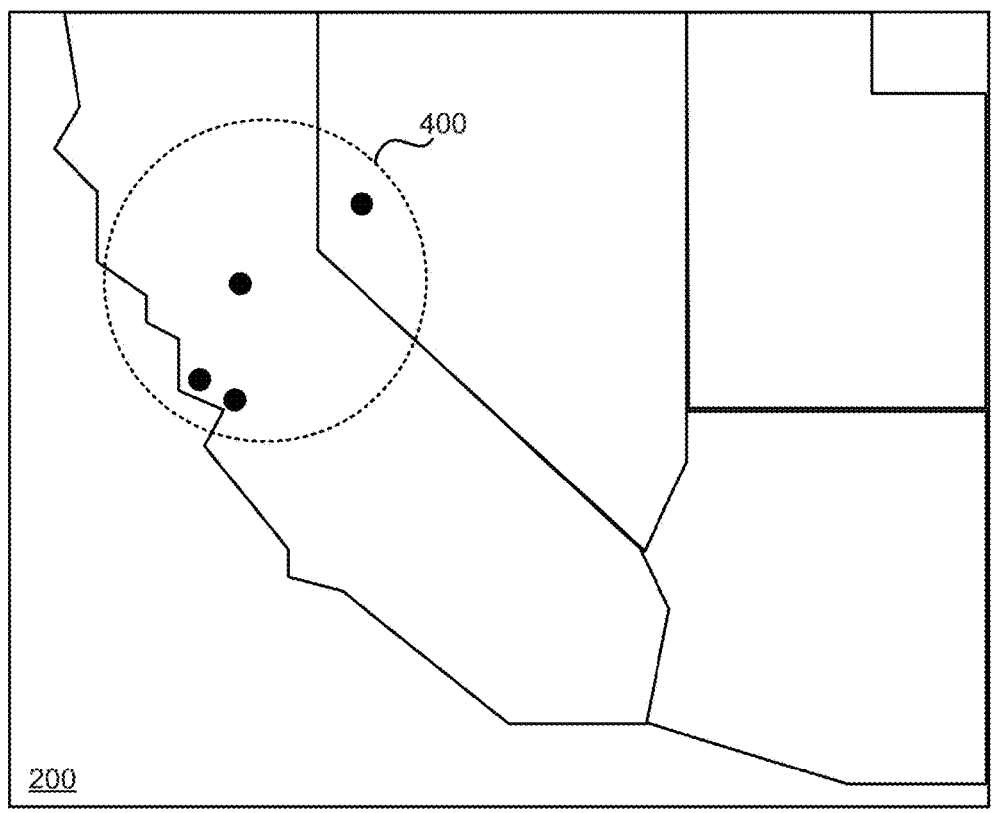
FIGS. 4A-4C illustrate example map filters according to some embodiments.
Figure 4B:
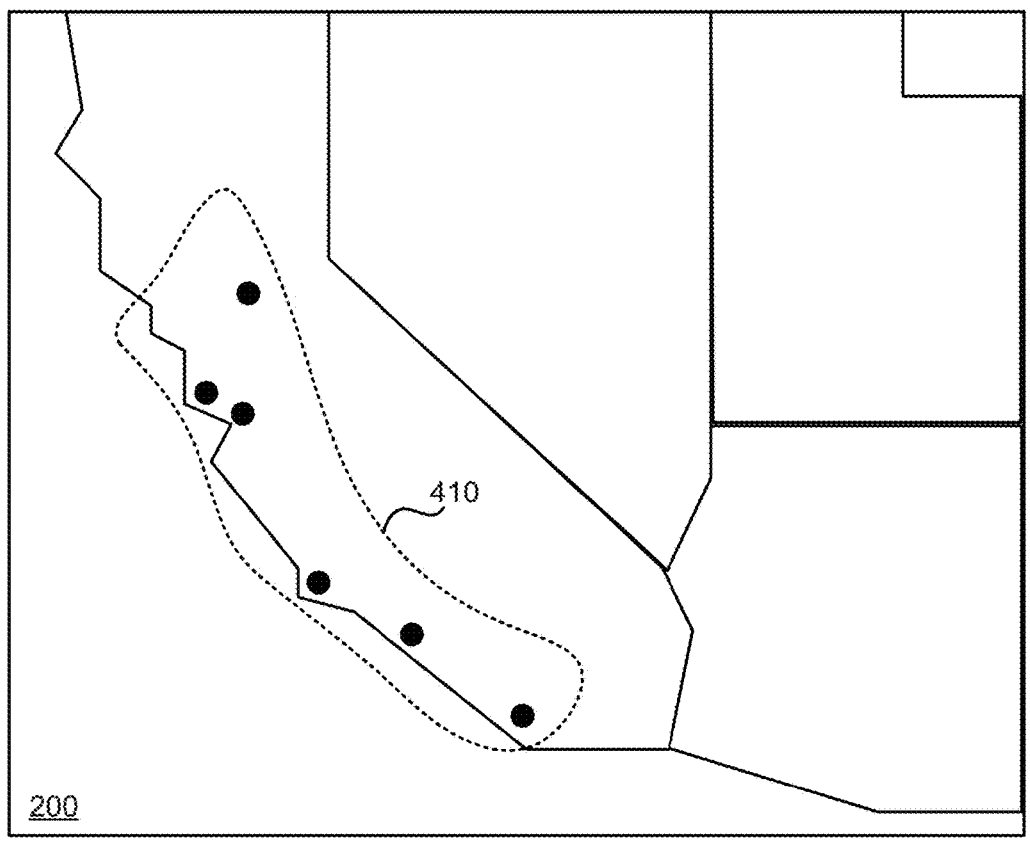
Figure 4C:
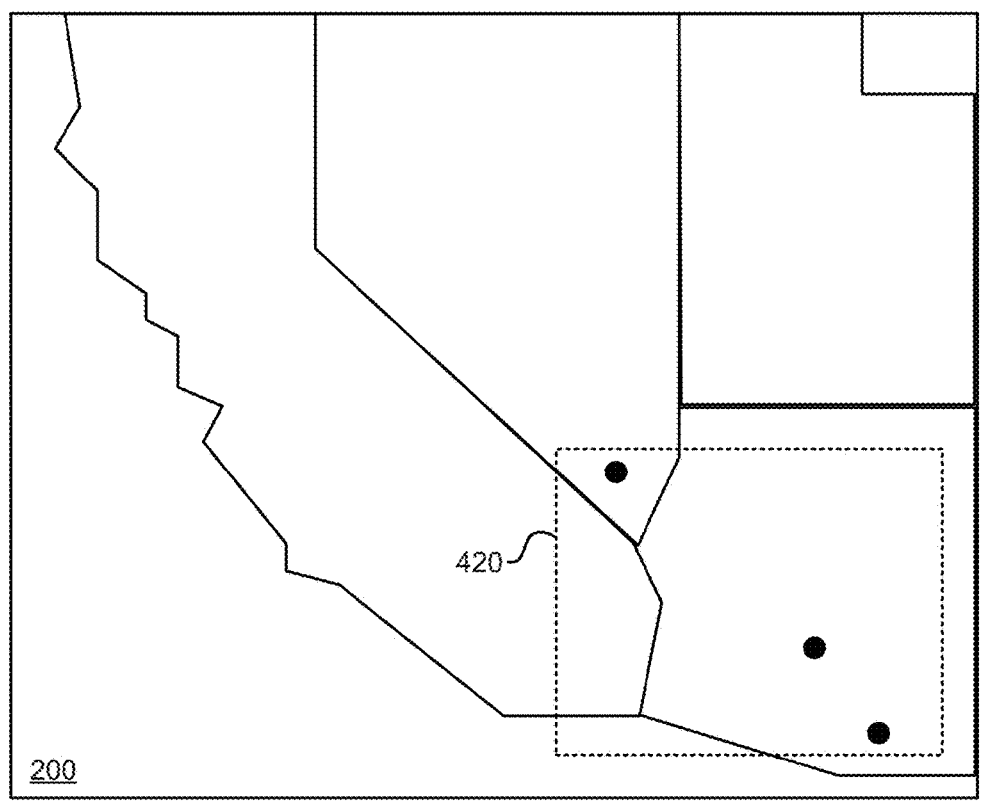

Types of spatial filters may include a map filter, a location filter, or a distance filter. A map filter filters for geo-enriched data based on a defined geometry. The spatial parameters associated with a map filter may include a geometry of a polygon. FIGS. 4A-4C illustrate example map filters according to some embodiments. In particular, FIG. 4A illustrates an example map filter 400. For this example, map filter 400 is defined by a circular-shaped geometric shape. As shown, the geographic locations of stores (San Francisco, Palo Alto, Sacramento, and Reno in this example) within map filter 400 are included in map visualization 200. In some embodiments, a tool (not shown) included in the map visualization 200 is used to define map filter 400. FIG. 4B illustrates another example map filter 410. In this example, map filter 410 is defined by a user-define shaped. As illustrated, the geographic locations of stores (San Francisco, Palo Alto, Sacramento, Santa Barbara, Los Angeles and San Diego in this example) within map filter 410 are included in map visualization 200. In some embodiments, a tool (not shown) included in the map visualization 200 is used to define map filter 410. Finally, FIG. 4C illustrates an example map filter 420. For this example, map filter 420 is defined by a rectangular-shaped geometric shape. As shown, the geographic locations of stores (Las Vegas, Phoenix, and Tucson in this example) within map filter 420 are included in map visualization 200. In some embodiments, a tool (not shown) included in the map visualization 200 is used to define map filter 420.

Figure 5:
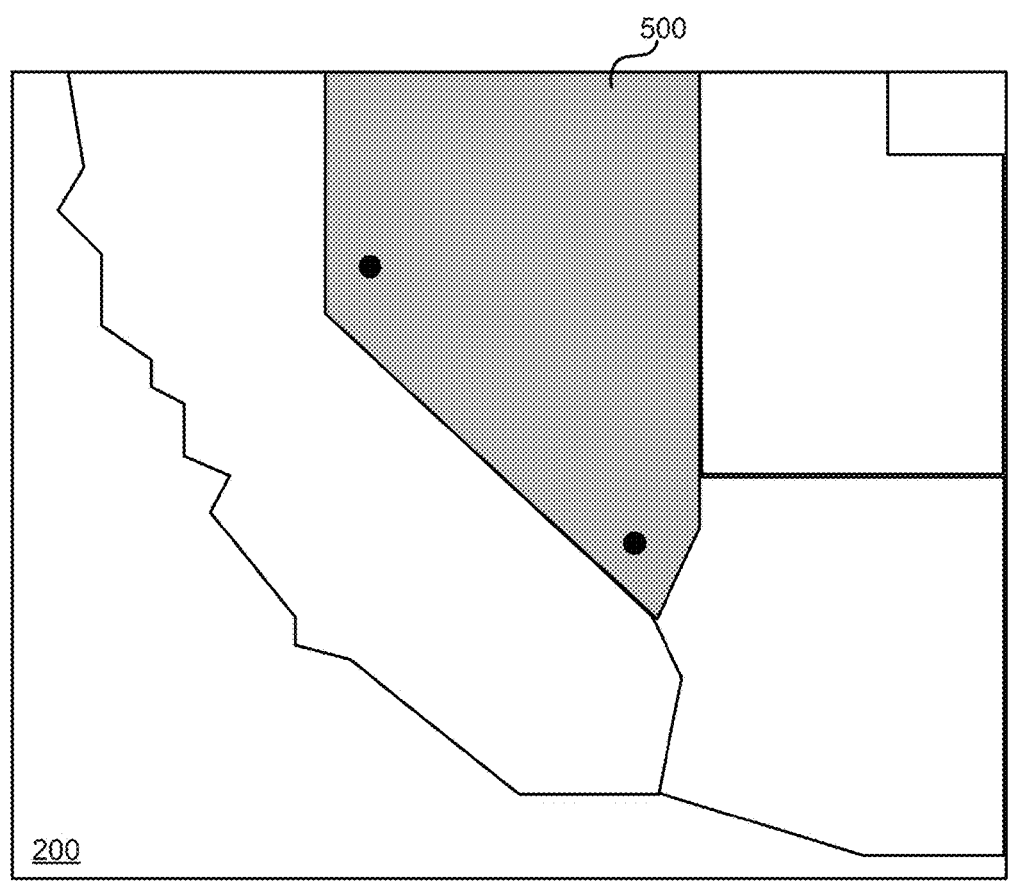
FIG. 5 illustrates an example location filter according to some embodiments.

A location filter filters for geo-enriched data based on a defined geographical element. The spatial parameters associated with a location filter may include a geometry of the defined geographical element. FIG. 5 illustrates an example location filter 500 according to some embodiments. In this example, location filter 500 is the defined state of Nevada as indicated by a gray shading of the state. As illustrated, the geographic locations of stores (Reno and Las Vegas in this example) within location filter 500 are included in map visualization 200.

Figure 6:
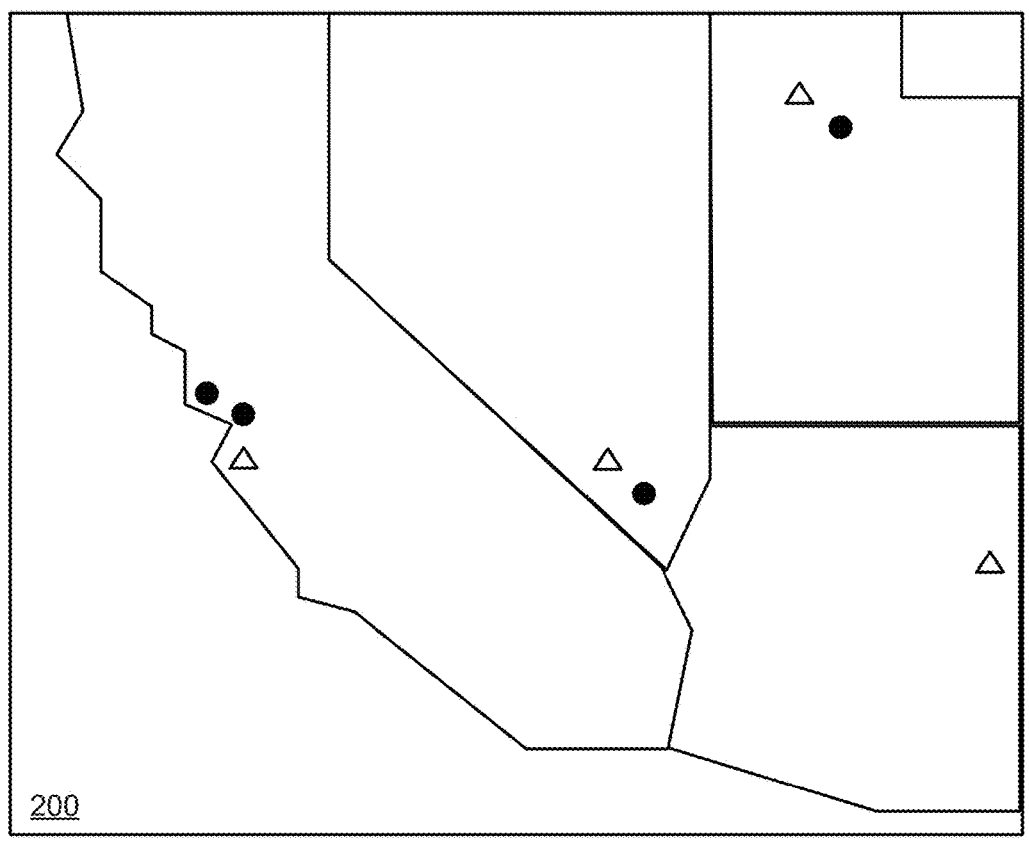
FIG. 6 illustrates an example distance filter according to some embodiments.

A distance filter filters for geo-enriched data based on a defined distance of a set of geographical elements. The spatial parameters associated with a distance filter may include the defined distance and a set of geometries of the set of geographical elements. FIG. 6 illustrates an example distance filter according to some embodiments. As shown, map visualization 200 includes distance filter tool 600 that is configured to define a distance filter. In this example, the defined distance filter specifies for the locations of stores (San Francisco, Palo Alto, Las Vegas, and Salt Lake City in this example) that are within 100 miles of state parks, which are represented by triangles in map visualization 200.

Types of filter scopes may include a local filter, a group filter, and a global filter. In some embodiments, a local filter is a spatial filter that is associated with a visualization for which the spatial filter is created. A location filter may be applied to just this visualization. In some embodiments, a group filter is a spatial filter that is associated with two or more visualizations. (e.g., a visualization for which the spatial filter is created and one or more specified visualizations). In some embodiments, a definition of a group filter specifies the two or more visualizations (e.g., visualization IDs associated with the two or more visualizations). A group filter may be applied to the two or more visualizations. In some embodiments, a global filter is a spatial filter that is associated with every visualization managed by visualization manager 115. A global filter is applied to all these visualizations.

Figure 7:
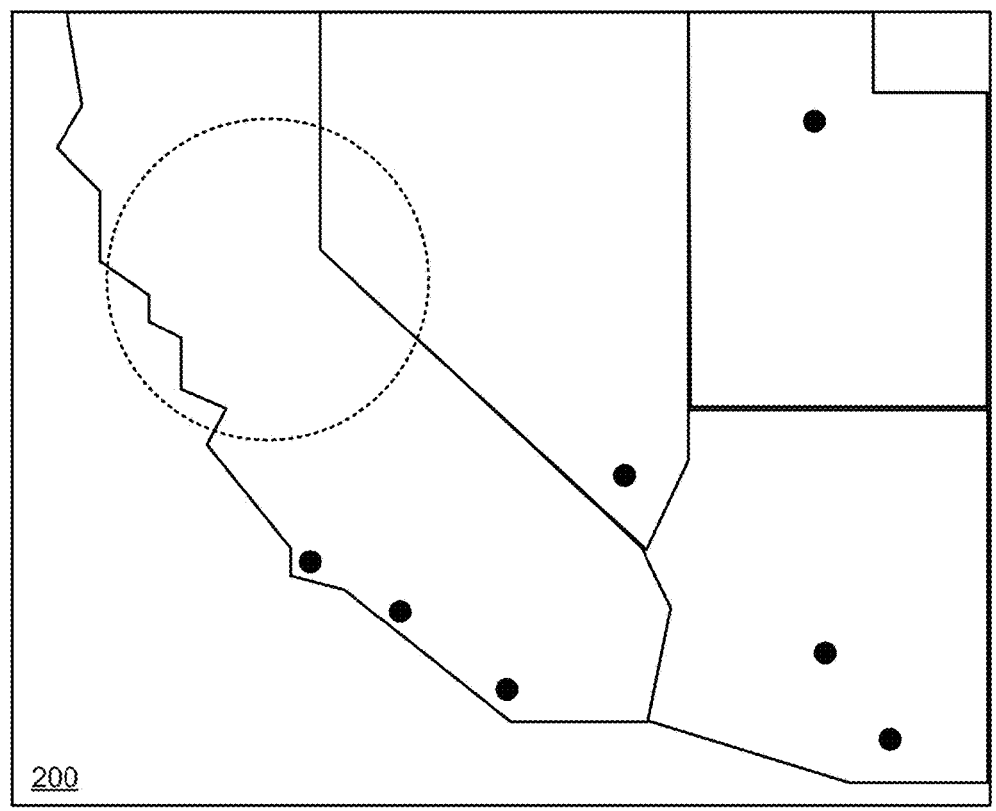
FIG. 7 illustrates the map filter illustrated in FIG. 4A with a negation option enabled according to some embodiments.

When a negation option is specified in a spatial filter definition, the filtering operation of the spatial filter is reversed. In some embodiments, a map filter filters for geo-enriched data that are within on a defined geometry. When a negation option is specified in a definition for such a map filter, the map filter filters for geo-enriched data that are not within on the defined geometry. FIG. 7 illustrates the example map filter 400 illustrated in FIG. 4A with a negation option enabled according to some embodiments. As shown, the geographic locations of stores (Santa Barbara, Los Angeles, San Diego, Las Vegas, Salt Lake City, Phoenix, and Tucson in this example) not within map filter 400 are included in map visualization 200.

Figure 8:
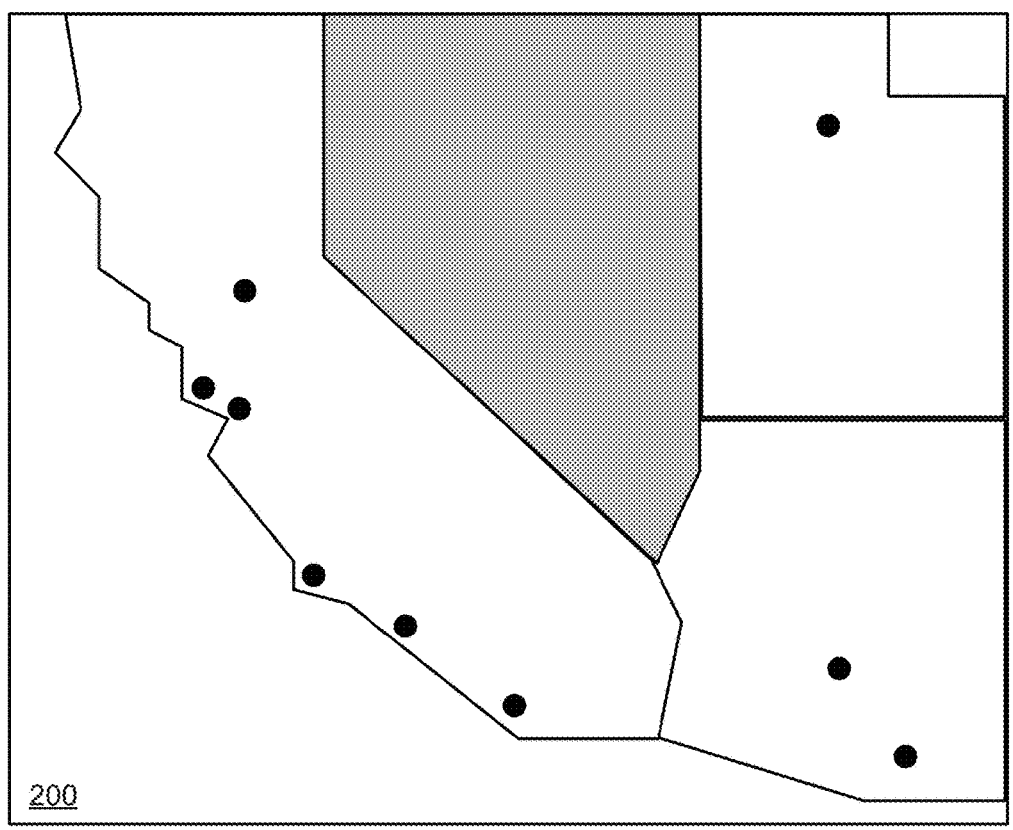
FIG. 8 illustrates the location filter illustrated in FIG. 5 with a negation option enabled according to some embodiments.

In some embodiments, a location filter filters for geo-enriched data that are within a defined geometry of a geographical element. When a negation option is specified in a definition for such a location filter, the location filter filters for geo-enriched data that are not within the defined geometry of the geographical element. FIG. 8 illustrates the location filter illustrated in FIG. 5 with a negation option enabled according to some embodiments. As illustrated, the geographic locations of stores (San Francisco, Palo Alto, Sacramento, Santa Barbara, Los Angeles, San Diego, Salt Lake City, Phoenix, and Tucson in this example) not within location filter 500 are included in map visualization 200.

Figure 9:
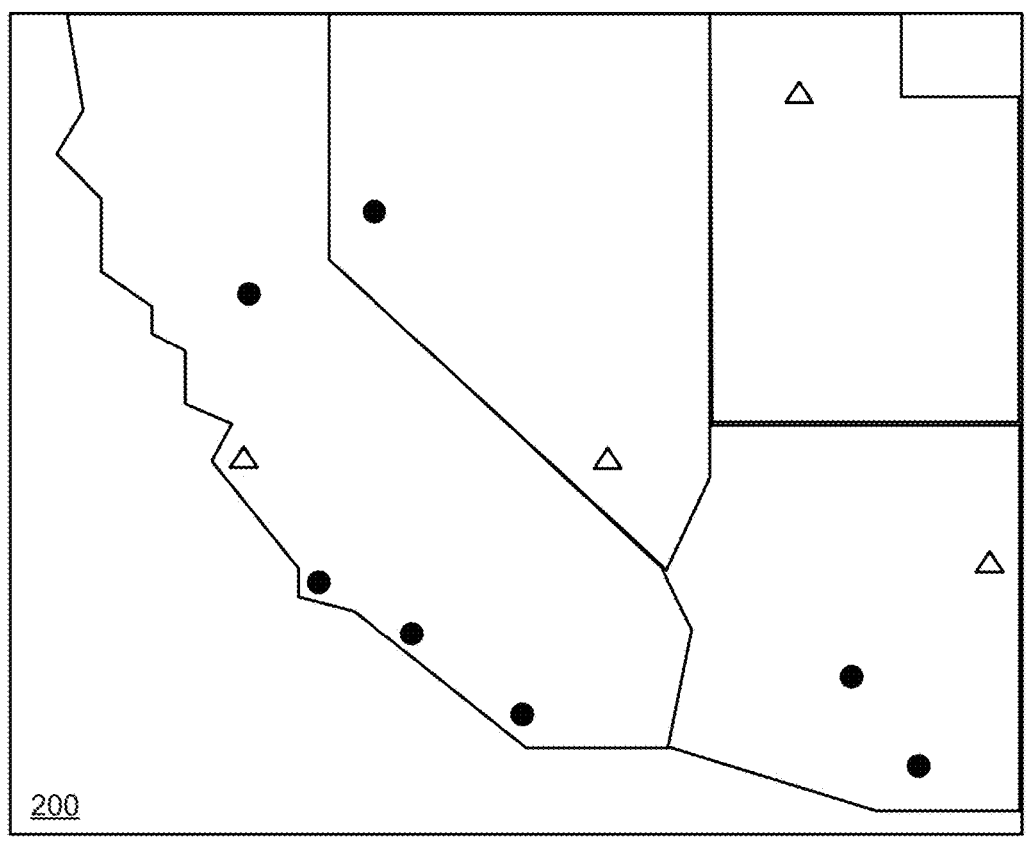
FIG. 9 illustrates the distance filter illustrated in FIG. 6 with a negation option enabled according to some embodiments.

In some embodiments, a distance filter filters for geo-enriched data that are within a defined distance of at least one geographical elements in a set of geographical elements. When a negation option is specified in a definition for such a distance filter, the distance filter filters for geo-enriched data that are not within the defined distance at least one geographical elements in a set of geographical elements. FIG. 9 illustrates the distance filter illustrated in FIG. 6 with a negation option enabled according to some embodiments. As shown, the distance filter defined using distance filter tool 600 specifies for the locations of stores (Sacramento, Santa Barbara, Los Angeles, San Diego, Reno, Phoenix, and Tucson in this example) that are not within 100 miles of state parks. Such locations of stores are included in map visualization 200 in FIG. 9.

As explained above, visualization manager 115 creates a spatial filter according to a definition of the spatial filter when visualization manager 110 receives a request to create the spatial filter. Upon creating a local filter, visualization manager 110 updates the visualization by sending query manager 125 a query for geo-enriched data associated with the visualization and the local filter. Visualization manager 110 then keeps and manages the local filter for the visualization. When such a visualization is requested to be generated or updated, visualization manager 110 sends query manager 125 a query for geo-enriched data associated with the visualization and the local filter associated with the visualization. Upon creating a group filter, visualization manager 110 sends the group filter to group filter 120. Upon creating a global filter, visualization manager 110 sends the global filter to global filter 115.

Figure 10:
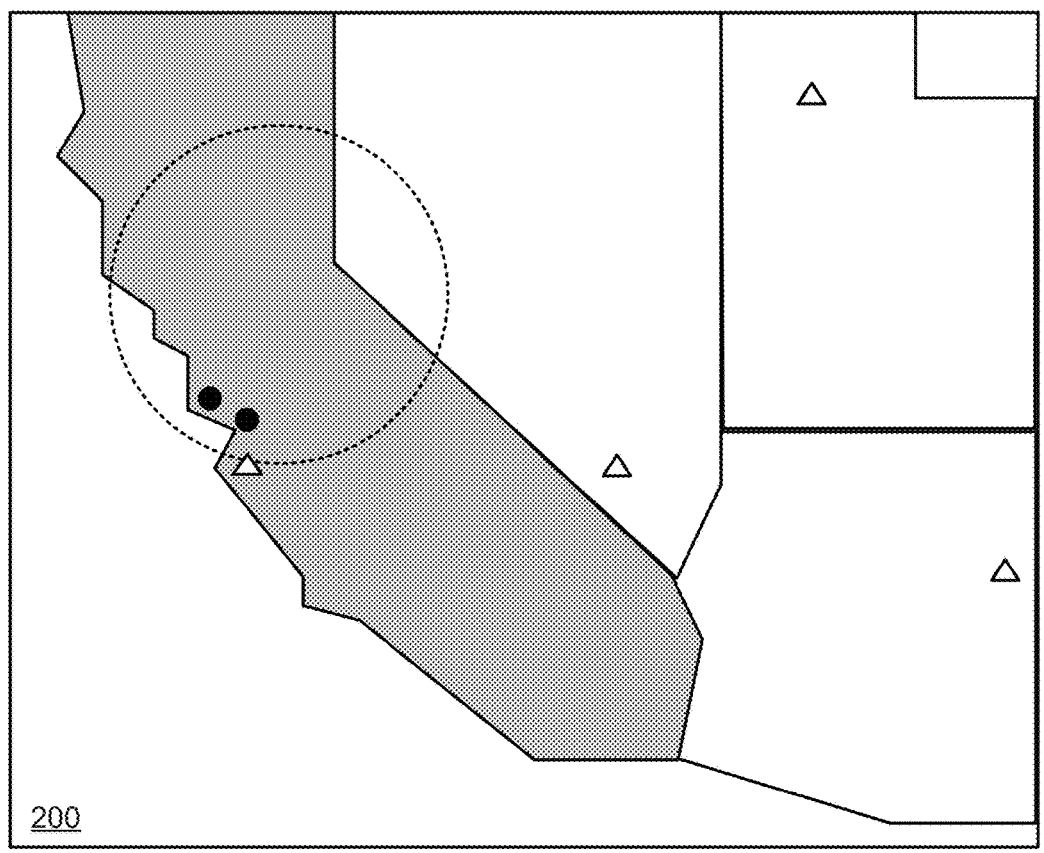
FIG. 10 illustrates the map visualization illustrated in FIG. 2 with different spatial filters according to some embodiments.

As mentioned above, a spatial filter may be created for a visualization. In some embodiments, different spatial filters may be created for and/or associated with a visualization. Thus, when such a visualization is generated, the spatial filters associated with the visualization are applied to the geo-enriched data associated with the visualization. As an example, FIG. 10 illustrates the map visualization 200 with different spatial filters according to some embodiments. For this example, map filter 400, location filter 1000, which is the defined stated of California, and distance filter 600 are created for map visualization 200. As illustrated, the geographic locations of stores (San Francisco and Palo Alto in this example) within map filter 400, location filter 1000, and within 100 miles of state parks are included in map visualization 200.

Figures 11, 12, 13:
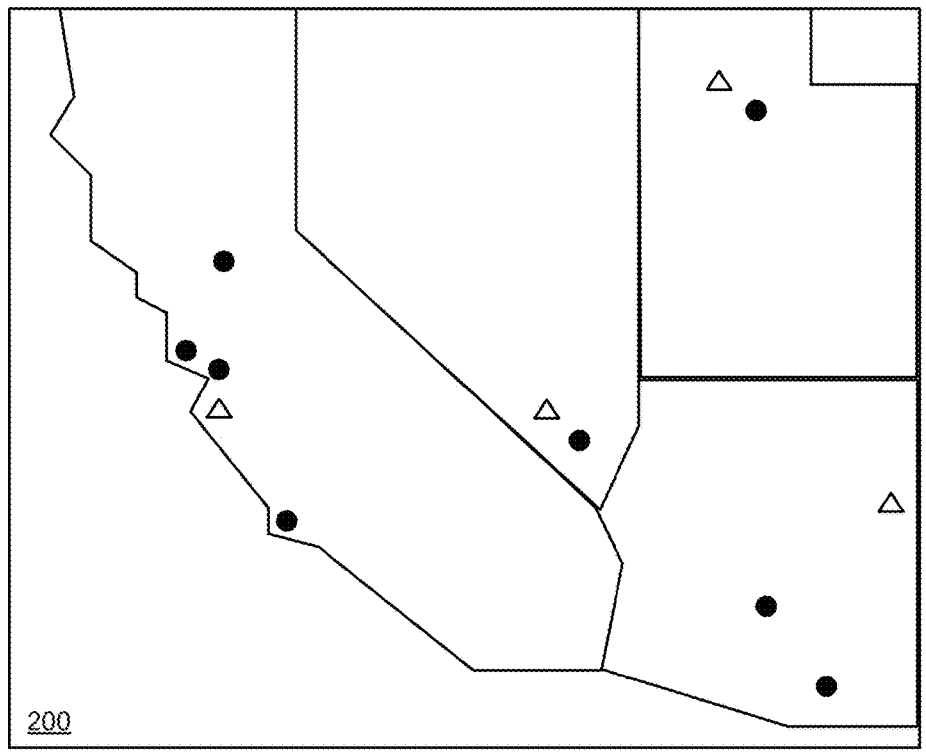
FIG. 11 illustrates an example modification to the distance filter illustrated in FIG. 6 according to some embodiments.
FIG. 12 illustrates the chart visualization illustrated in FIG. 3 after the distance filter illustrated in FIG. 6 is applied according to some embodiments.
FIG. 13 illustrates the chart visualization illustrated in FIG. 3 after the distance filter illustrated in FIG. 11 is modified according to some embodiments.

Visualization manager 110 also handles modifications to spatial filters associated with visualizations. For example, visualization manager 110 may receive (e.g., from a user of the client device 105) a modification to the geometry of a map filter, a selection of a different geographical element of a location filter, a modification to the distance of a distance filter, a modification to the set of geographical elements of a distance filter, etc. If the modification is for a local filter, visualization manager 110 updates the local filter accordingly. If the modification is for a group filter, visualization manager 110 sends group filter manager 115 the modified spatial filter. If the modification is for a global filter, visualization manager 110 sends global filter manager 120 the modified spatial filter. In some embodiments, visualization manager 110 also generates the visualization to which a spatial filter is associated when the spatial filter is modified. In this manner, the visualization is updated when a spatial filter associated with the visualization is modified. As an example, FIG. 11 illustrates an example modification to the distance filter illustrated in FIG. 6 according to some embodiments. In this example, the distance filter has been modified specify for the locations of stores (San Francisco, Palo Alto, Sacramento, Santa Barbara, Las Vegas, Salt Lake City, Phoenix, and Tucson in this example) that are within 300 miles of state parks. FIG. 12 illustrates chart visualization 300 after the distance filter illustrated in FIG. 6 is applied according to some embodiments. As shown, chart visualization 300 includes the store sales of stores (San Francisco, Palo Alto, Las Vegas, and Salt Lake City in this example) shown in map visualization 200. FIG. 13 illustrates chart visualization 300 after the distance filter illustrated in FIG. 11 is modified according to some embodiments. As illustrated, chart visualization 300 includes the store sales of stores (San Francisco, Palo Alto, Sacramento, Santa Barbara, Las Vegas, Salt Lake City, Phoenix, and Tucson in this example) shown in map visualization 200.

Group filter manager 115 is configured to manage group filters received from visualization manager 110. When group filter manager 115 receives a particular group filter from visualization manager 110, group filter manager 115 compares the unique identifier of the particular group filter with the unique identifiers of the collection of group filters that group filter manager 115 is managing. If the unique identifier of the particular group filter is the same as the unique identifier of a group filter managed by group filter manager 115, group filter manager 115 updates that group filter with the particular group filter. Otherwise, group filter manager 115 adds the particular group filter to the collection of group filters that group filter manager 115 is managing. Group filter manager 115 then identifies the visualizations associated with the particular group filter and sends visualization manager 110 a request to update the identified visualizations. In this manner, visualizations associated with a group filter are updated when a group filter is created or updated.

Group filter manager 115 may receive requests from visualization manager 110 to delete a group filter. In response to such a request, group filter manager 115 identifies the group filter (e.g., based on the unique identifier of the requested group filter) in the collection of group filters and deletes the identified group filter. Group filter manager 115 may also receive a request from query manager 125 for group filters associated with a particular visualization and a visualization ID associated with the particular visualization. In response, group filter manager 115 identifies group filters that specify the visualization ID of the particular visualization and sends the identified group filters to query manager 125.

Global filter manager 120 is configured to manage global filters received from visualization manager 110. When global filter manager 120 receives a particular global filter from visualization manager 110, global filter manager 120 compares the unique identifier of the particular global filter with the unique identifiers of the collection of global filters that global filter manager 120 is managing. If the unique identifier of the particular global filter is the same as the unique identifier of a global filter managed by global filter manager 120, global filter manager 120 updates that global filter with the particular global filter. Otherwise, global filter manager 120 adds the particular global filter to the collection of global filters that global filter manager 120 is managing. Global filter manager 120 then sends visualization manager 110 a request to update all the visualizations that visualization manager 110 is managing. In this manner, all visualizations are updated when a global filter is created or updated.

Global filter manager 120 may receive requests from visualization manager 110 to delete a global filter. In response to such a request, global filter manager 120 identifies the global filter (e.g., based on the unique identifier of the requested global filter) in the collection of global filters and deletes the identified global filter. Global filter manager 120 may also receive a request from query manager 125 for global filters managed by global filter manager 120. In response, global filter manager 120 sends query manager 125 the collection of global filters.

Query manager 125 is configured to send queries for geo-enriched and spatial filters to geo-enriched data system 130. For instance, query manager 125 may receive from visualization manager 110 a visualization ID associated with a visualization and a query for geo-enriched data associated with the visualization. In some instances, query manager 125 may receive one or more local filters associated with visualization. Next, query manager 125 sends group filter 115 a request for group filters associated with the visualization and the visualization ID associated with the visualization. In return, query manager 125 receives zero or more group filters associated with the visualization. Query manager 125 then sends global filter 120 a request for global filters. In return, query manager 125 receives zero or more global filters associated with the visualization. Next, query manager 125 sends geo query manager 135 the query for geo-enriched data associated with the visualization and any local, group, and/or global filters associated with the visualization. Finally, query manager 125 receives from geo query manager 135 geo-enriched data associated with the visualization, which query manager 125 sends to visualization manager 110.

Geo-enriched data system 130 is responsible for processing queries for geo-enriched data received from client device 105. As illustrated in FIG. 1, geo-enriched data system 130 includes geo query manager 135 and database system 140. In some embodiments, geo query manager 135 and database system 140 are implemented on single computing device while, in other embodiments, geo query manager 135 and database system 140 are implemented on separate computing devices. Geo query manager 135 and database system 140 may be implemented on a cloud computing system in some embodiments.

Geo query manager 135 is configured to handle queries for geo-enriched data from client device 105. For instance, geo query manager 135 receives queries for geo-enriched data and spatial filters from client device 105. When geo query manager 135 receives a query and spatial filters from client device 105, geo query manager 135 sends the query and spatial filters to query processor 145 for processing. In return, geo query manager 135 receives from query processor 145 results of the query. Geo query manager 135 then sends client device 105 results of the query.

Database system 140 is configured to manage geo-enriched data stored in database system 140. As shown, database system 140 includes query processor 145, data models storage 150, and geo-enriched data storage 155. Data models storage 150 is configured to store data models from which geo-enriched data is modeled. Geo-enriched data storage 155 is configured to store geo-enriched data. In some embodiments, storages 150 and 155 are implemented in a single physical storage while, in other embodiments, storages 150 and 155 may be implemented across several physical storages. While FIG. 1 shows storages 150 and 155 included in database system 140, one of ordinary skill in the art will appreciated that storages 150 and/or 155 may be external to database system 140 in some embodiments.

Query processor 145 processes queries received from geo query manager 135. For instance, when query processor 145 receives a query (e.g., a structured query language (SQL) query) for geo-enriched data and spatial filters from geo query manager 135, query processor accesses geo-enriched data storage 150 and identifies geo-enriched data based on the query. Query manager 135 then applies the spatial filters to the identified geo-enriched data in order to identify a subset of the identified geo-enriched data.

In some embodiments, query processor 145 applies the spatial filters on the identified geo-enriched data by performing corresponding spatial operations on the identified geo-enriched data. For example, when query processor 145 applies a map filter on geo-enriched data, query processor 145 performs a spatial operation that determines the geo-enriched data that are within the defined geometry of the map filter. For a map filter that specifies a negation option, query processor 145 performs a spatial operation that determines the geo-enriched data that are not within the defined geometry of the map filter. When query processor 145 applies a location filter on geo-enriched data, query processor 145 performs a spatial operation that determines the geo-enriched data that are within the defined geometry of the geographical element of the location filter. For a location filter that specifies a negation option, query processor 145 performs a spatial operation that determines the geo-enriched data that are not within the defined geometry of the geographical element of the location filter. When query processor 145 applies a distance filter on geo-enriched data, query processor 145 performs a spatial operation that determines the geo-enriched data that are within the defined distance at least one geographical elements in a set of geographical elements of the distance filter. For a distance filter that specifies a negation option, query processor 145 performs a spatial operation that determines the geo-enriched data that are not within the defined distance at least one geographical elements in a set of geographical elements of the distance filter. Once query manager 145 has applied spatial filters to the identified geo-enriched data, query processor 145 then sends geo query manager 135 the subset of the identified geo-enriched data.

FIG. 1 illustrates a system that includes a client device and a geo-enriched data system. One of ordinary skill in the art will understand that the system may include any number of additional client devices that are configured to interact with the geo-enriched data system in the same or similar manner as that described above by reference to client device 105.

Figure 14:
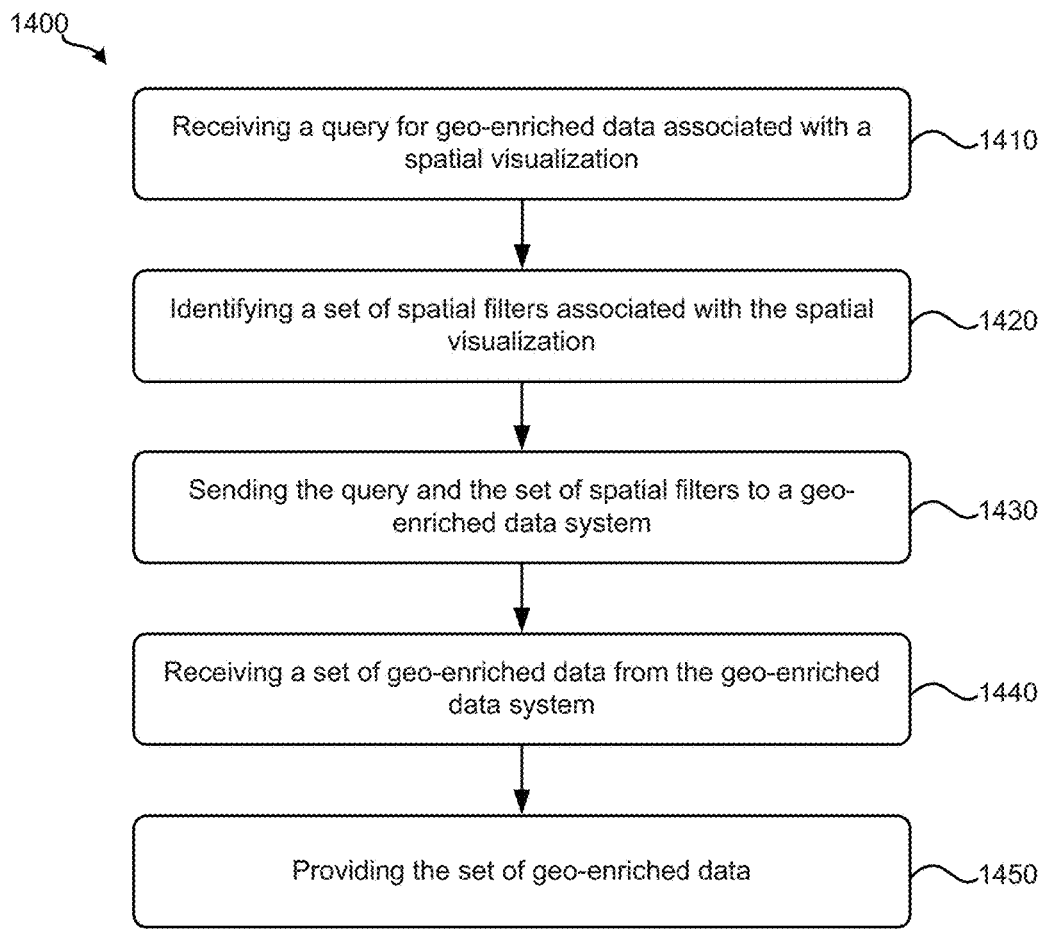
FIG. 14 illustrates a process for providing geo-enriched data for a visualization according to some embodiments.

FIG. 14 illustrates a process 1400 for providing geo-enriched data for a visualization according to some embodiments. In some embodiments, query manager 125 performs process 1400. For instance, query manager 125 performs process 1400 for each visualization specified in a group filter when the group filter is created or updated. In addition, query manager 125 may perform process 1400 for each visualization when a global filter is created or updated. Process 1400 begins by receiving, at 1410, a query for geo-enriched data associated with a visualization. In some embodiments, process 1400 receives the query from visualization manager 110. Process 1400 may receive a local filter from visualization manager 110 in some instances.

Next, process 1400 identifies, at 1420, a set of spatial filters associated with the visualization. In instances where process 1400 receives a local filter along with the query, process identifies the local filter as a spatial filter in the set of spatial filters. Process 1400 may identify the set of spatial filters by sending group filter manager 115 a request for group filters associated with the visualization and sending global filter manager 120 a request for the global filters managed by global filter manager 120.

Process 1400 then sends, at 1430, the query and the set of spatial filters to geo-enriched data system 130. Specifically, process 1400 sends the query and the set of spatial filters to geo query manager 135. Next, process 1400 receives, at 1440, a set of geo-enriched data from geo-enriched data system 130. In particular, process 1400 receives the set of geo-enriched data from geo query manager 135. Finally, process 1400 provides, at 1450, the set of geo-enriched data. In some embodiments, process 1400 provides the set of geo-enriched data to visualization manager 110 so that visualization manager 110 may generate the visualization to include the set of geo-enriched data.

Figure 15:
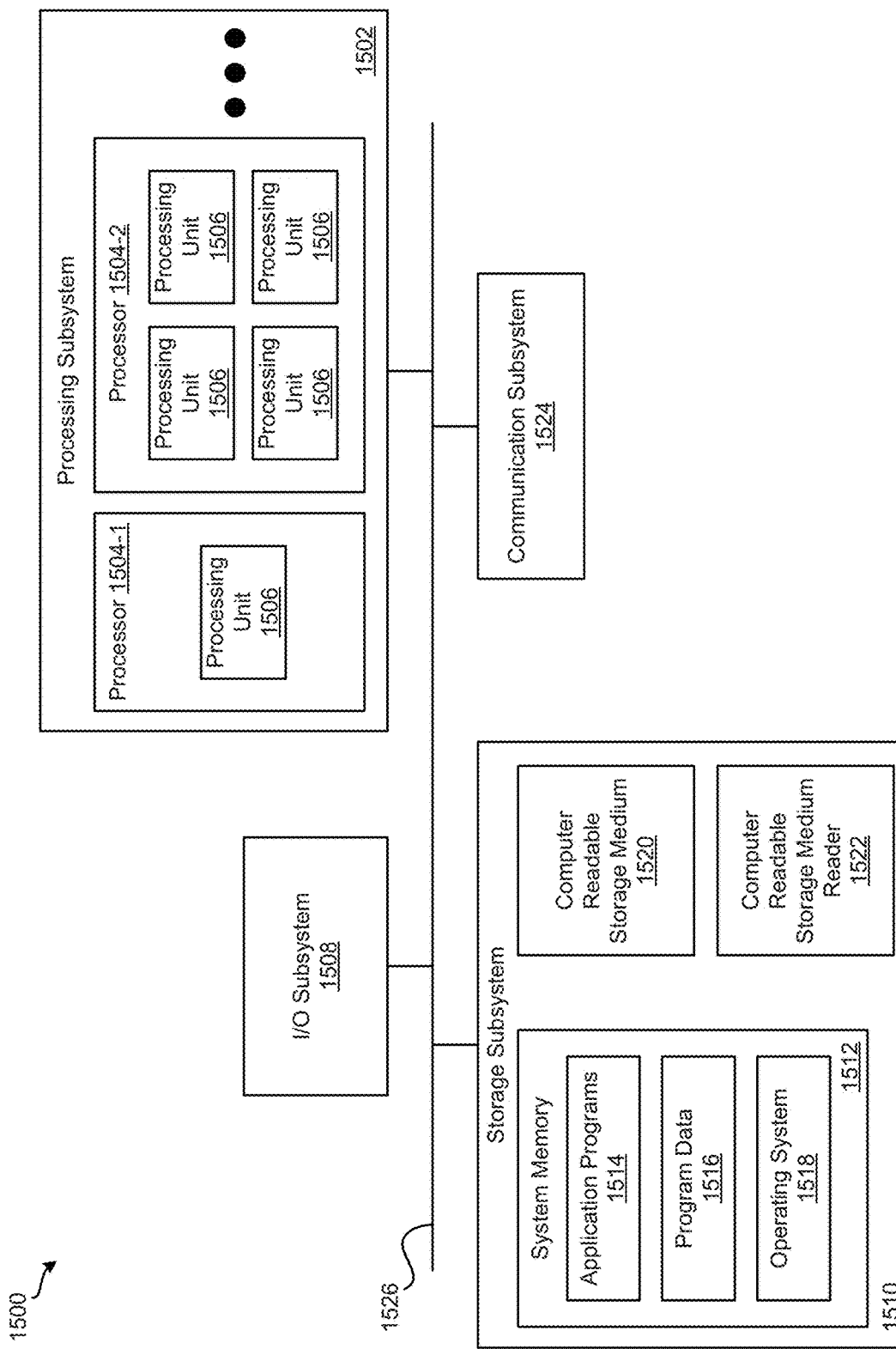
FIG. 15 illustrates an exemplary computer system, in which various embodiments may be implemented.

FIG. 15 illustrates an exemplary computer system 1500, in which various embodiments may be implemented. For example, computer system 1500 may be used to implement client device 105 and geo-enriched data system 130. Computer system 1500 may be a desktop computer, a laptop, a server computer, or any other type of computer system or combination thereof. Some or all elements of visualization manager 110, group filter manager 115, global filter manager 120, query manager 125, geo query manager 135, database system 140, and query processor 145, or combinations thereof can be included or implemented in computer system 1500. In addition, computer system 1500 can implement many of the operations, methods, and/or processes described above (e.g., process 1400). As shown in FIG. 15, computer system 1500 includes processing subsystem 1502, which communicates, via bus subsystem 1526, with input/output (I/O) subsystem 1508, storage subsystem 1510 and communication subsystem 1524.

Bus subsystem 1526 is configured to facilitate communication among the various components and subsystems of computer system 1500. While bus subsystem 1526 is illustrated in FIG. 15 as a single bus, one of ordinary skill in the art will understand that bus subsystem 1526 may be implemented as multiple buses. Bus subsystem 1526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1502, which can be implemented as one or more integrated circuits (e.g., a conventional microprocessor or microcontroller), controls the operation of computer system 1500. Processing subsystem 1502 may include one or more processors 1504. Each processor 1504 may include one processing unit 1506 (e.g., a single core processor such as processor 1504-1) or several processing units 1506 (e.g., a multicore processor such as processor 1504-2). In some embodiments, processors 1504 of processing subsystem 1502 may be implemented as independent processors while, in other embodiments, processors 1504 of processing subsystem 1502 may be implemented as multiple processors integrate into a single chip or multiple chips. Still, in some embodiments, processors 1504 of processing subsystem 1502 may be implemented as a combination of independent processors and multiple processors integrated into a single chip or multiple chips.

In some embodiments, processing subsystem 1502 can execute a variety of programs or processes in response to program code and can maintain multiple concurrently executing programs or processes. At any given time, some or all of the program code to be executed can reside in processing subsystem 1502 and/or in storage subsystem 1510. Through suitable programming, processing subsystem 1502 can provide various functionalities, such as the functionalities described above by reference to process 1400, etc.

I/O subsystem 1508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1500 to a user or another device (e.g., a printer).

As illustrated in FIG. 15, storage subsystem 1510 includes system memory 1512, computer-readable storage medium 1520, and computer-readable storage medium reader 1522. System memory 1512 may be configured to store software in the form of program instructions that are loadable and executable by processing subsystem 1502 as well as data generated during the execution of program instructions. In some embodiments, system memory 1512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1512 may include different types of memory, such as static random access memory (SRAM) and/or dynamic random access memory (DRAM). System memory 1512 may include a basic input/output system (BIOS), in some embodiments, that is configured to store basic routines to facilitate transferring information between elements within computer system 1500 (e.g., during start-up). Such a BIOS may be stored in ROM (e.g., a ROM chip), flash memory, or any other type of memory that may be configured to store the BIOS.

As shown in FIG. 15, system memory 1512 includes application programs 1514, program data 1516, and operating system (OS) 1518. OS 1518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1520 may be a non-transitory computer-readable medium configured to store software (e.g., programs, code modules, data constructs, instructions, etc.). Many of the components (e.g., visualization manager 110, group filter manager 115, global filter manager 120, query manager 125, geo query manager 135, database system 140, and query processor 145) and/or processes (e.g., process 1400) described above may be implemented as software that when executed by a processor or processing unit (e.g., a processor or processing unit of processing subsystem 1502) performs the operations of such components and/or processes. Storage subsystem 1510 may also store data used for, or generated during, the execution of the software.

Storage subsystem 1510 may also include computer-readable storage medium reader 1522 that is configured to communicate with computer-readable storage medium 1520. Together and, optionally, in combination with system memory 1512, computer-readable storage medium 1520 may comprehensively represent remote, local, fixed, and/or removable storage devices plus storage media for temporarily and/or more permanently containing, storing, transmitting, and retrieving computer-readable information.

Computer-readable storage medium 1520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1524 serves as an interface for receiving data from, and transmitting data to, other devices, computer systems, and networks. For example, communication subsystem 1524 may allow computer system 1500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1524 may provide components configured for wired communication (e.g., Ethernet) in addition to or instead of components configured for wireless communication.

One of ordinary skill in the art will realize that the architecture shown in FIG. 15 is only an example architecture of computer system 1500, and that computer system 1500 may have additional or fewer components than shown, or a different configuration of components. The various components shown in FIG. 15 may be implemented in hardware, software, firmware or any combination thereof, including one or more signal processing and/or application specific integrated circuits.

Figure 16:
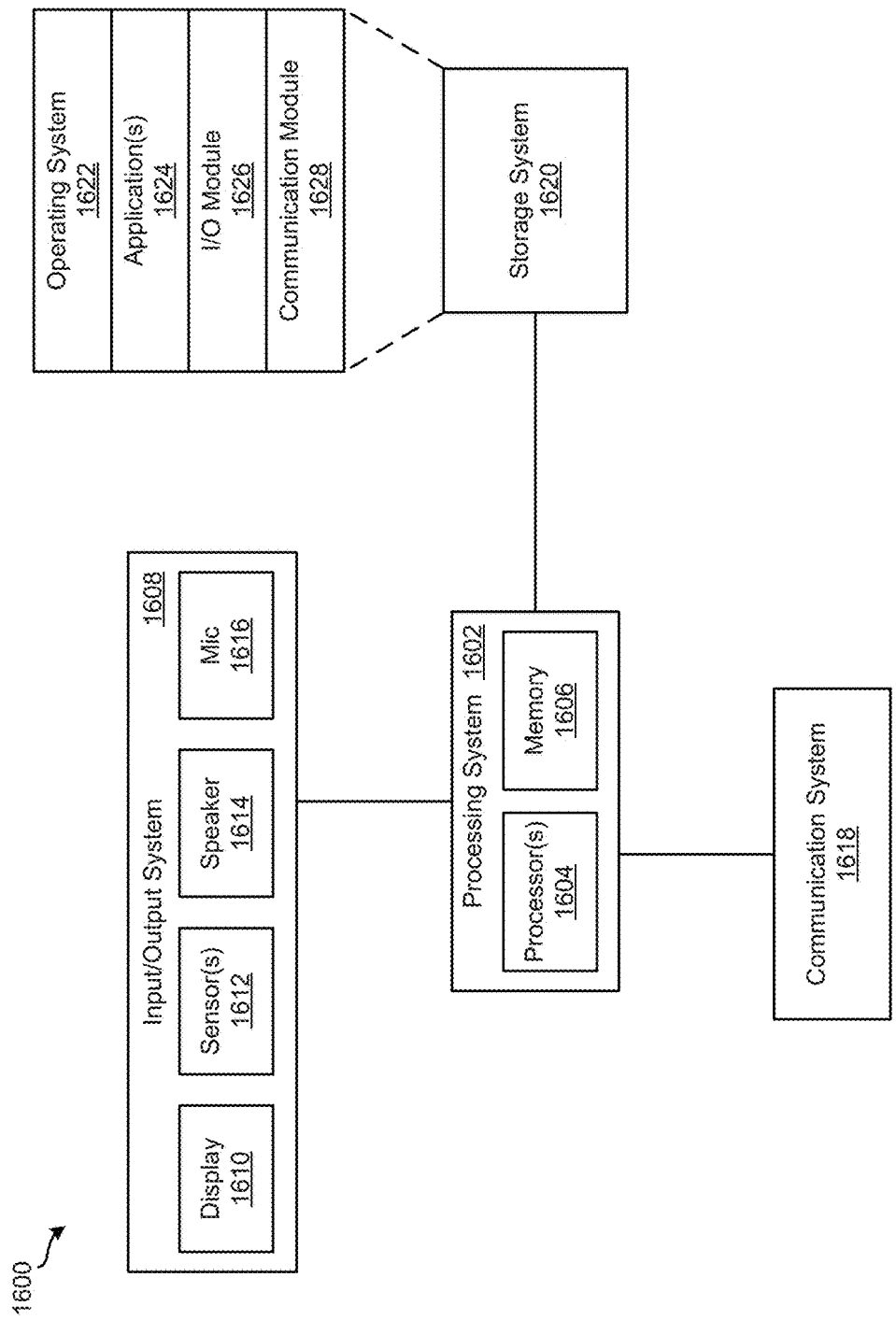
FIG. 16 illustrates an exemplary computing device, in which various embodiments may be implemented.

FIG. 16 illustrates an exemplary computing device 1600, in which various embodiments may be implemented. For example, computing device 1600 may be used to implement client device 105. Computing device 1600 may be a cellphone, a smartphone, a wearable device, an activity tracker or manager, a tablet, a personal digital assistant (PDA), a media player, or any other type of mobile computing device or combination thereof. Some or all elements of visualization manager 110, group filter manager 115, global filter 120, and query manager 125, or combinations thereof can be included or implemented in computing device 1600. In addition, computing device 1600 can implement many of the operations, methods, and/or processes described above (e.g., process 1400). As shown in FIG. 16, computing device 1600 includes processing system 1602, input/output (I/O) system 1608, communication system 1618, and storage system 1620. These components may be coupled by one or more communication buses or signal lines.

Processing system 1602, which can be implemented as one or more integrated circuits (e.g., a conventional microprocessor or microcontroller), controls the operation of computing device 1600. As shown, processing system 1602 includes one or more processors 1604 and memory 1606. Processors 1604 are configured to run or execute various software and/or sets of instructions stored in memory 1606 to perform various functions for computing device 1600 and to process data.

Each processor of processors 1604 may include one processing unit (e.g., a single core processor) or several processing units (e.g., a multicore processor). In some embodiments, processors 1604 of processing system 1602 may be implemented as independent processors while, in other embodiments, processors 1604 of processing system 1602 may be implemented as multiple processors integrate into a single chip. Still, in some embodiments, processors 1604 of processing system 1602 may be implemented as a combination of independent processors and multiple processors integrated into a single chip.

Memory 1606 may be configured to receive and store software (e.g., operating system 1622, applications 1624, I/O module 1626, communication module 1628, etc. from storage system 1620) in the form of program instructions that are loadable and executable by processors 1604 as well as data generated during the execution of program instructions. In some embodiments, memory 1606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1608 is responsible for receiving input through various components and providing output through various components. As shown for this example, I/O system 1608 includes display 1610, one or more sensors 1612, speaker 1614, and microphone 1616. Display 1610 is configured to output visual information (e.g., a graphical user interface (GUI) generated and/or rendered by processors 1604). In some embodiments, display 1610 is a touch screen that is configured to also receive touch-based input. Display 1610 may be implemented using liquid crystal display (LCD) technology, light-emitting diode (LED) technology, organic LED (OLED) technology, organic electro luminescence (OEL) technology, or any other type of display technologies. Sensors 1612 may include any number of different types of sensors for measuring a physical quantity (e.g., temperature, force, pressure, acceleration, orientation, light, radiation, etc.). Speaker 1614 is configured to output audio information and microphone 1616 is configured to receive audio input. One of ordinary skill in the art will appreciate that I/O system 1608 may include any number of additional, fewer, and/or different components. For instance, I/O system 1608 may include a keypad or keyboard for receiving input, a port for transmitting data, receiving data and/or power, and/or communicating with another device or component, an image capture component for capturing photos and/or videos, etc.

Communication system 1618 serves as an interface for receiving data from, and transmitting data to, other devices, computer systems, and networks. For example, communication system 1618 may allow computing device 1600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1618 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1618 may provide components configured for wired communication (e.g., Ethernet) in addition to or instead of components configured for wireless communication.

Storage system 1620 handles the storage and management of data for computing device 1600. Storage system 1620 may be implemented by one or more non-transitory machine-readable mediums that are configured to store software (e.g., programs, code modules, data constructs, instructions, etc.) and store data used for, or generated during, the execution of the software. Many of the components (e.g., visualization manager 110, group filter manager 115, global filter 120, and query manager 125) and/or processes (e.g., process 1400) described above may be implemented as software that when executed by a processor or processing unit (e.g., processors 1604 of processing system 1602) performs the operations of such components and/or processes.

In this example, storage system 1620 includes operating system 1622, one or more applications 1624, I/O module 1626, and communication module 1628. Operating system 1622 includes various procedures, sets of instructions, software components and/or drivers for controlling and managing general system tasks (e.g., memory management, storage device control, power management, etc.) and facilitates communication between various hardware and software components. Operating system 1622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1624 can include any number of different applications installed on computing device 1600. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1626 manages information received via input components (e.g., display 1610, sensors 1612, and microphone 1616) and information to be outputted via output components (e.g., display 1610 and speaker 1614). Communication module 1628 facilitates communication with other devices via communication system 1618 and includes various software components for handling data received from communication system 1618.

One of ordinary skill in the art will realize that the architecture shown in FIG. 16 is only an example architecture of computing device 1600, and that computing device 1600 may have additional or fewer components than shown, or a different configuration of components. The various components shown in FIG. 16 may be implemented in hardware, software, firmware or any combination thereof, including one or more signal processing and/or application specific integrated circuits.

Figure 17:
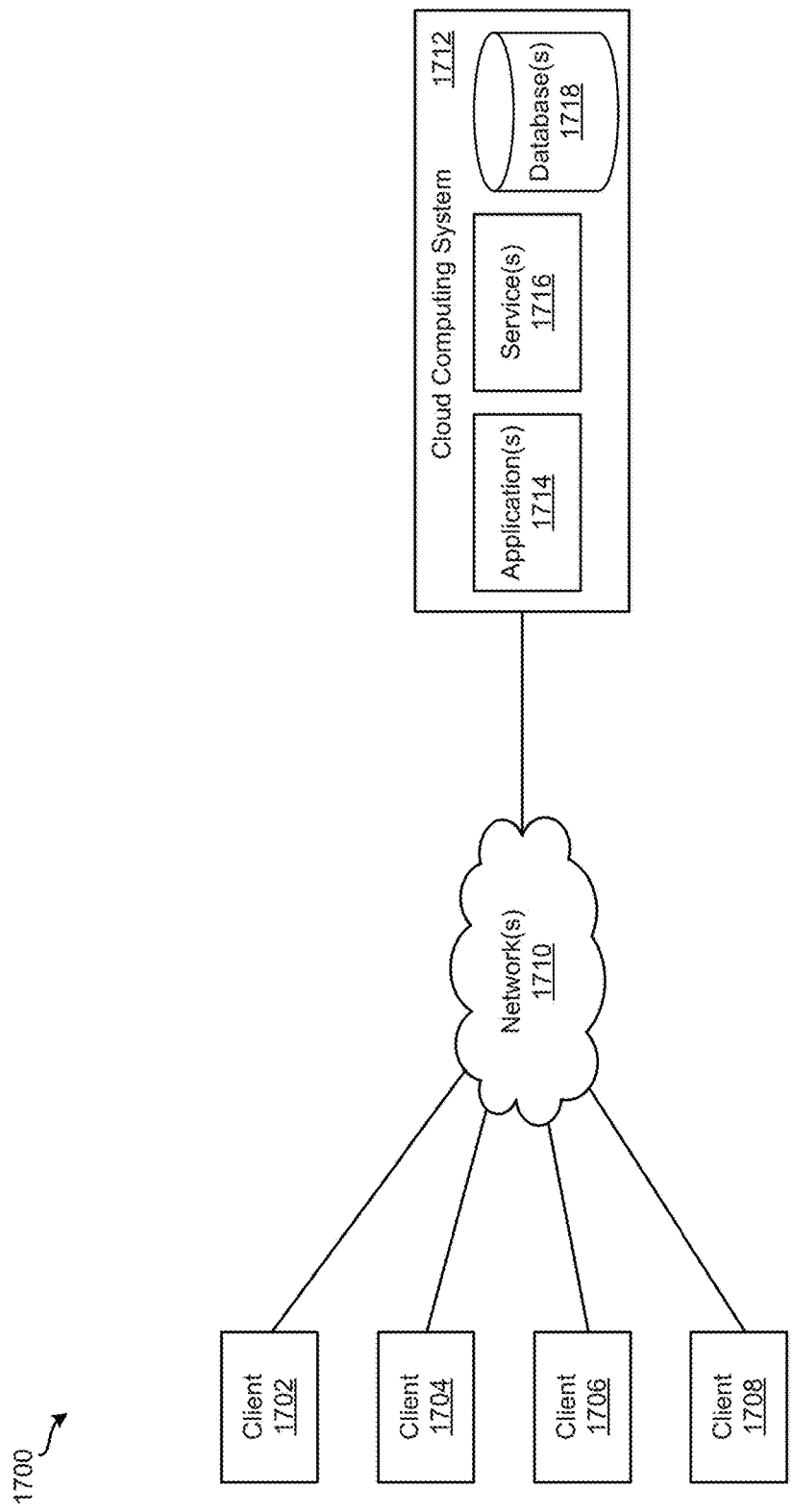
FIG. 17 illustrates system for implementing various embodiments described above.

FIG. 17 illustrates system 1700 for implementing various embodiments described above. For example, cloud computing device 1712 may be used to implement geo-enriched data system 130 and one of client devices 1702-1708 may be used to implement client device 105. As shown, system 1700 includes client devices 1702-1708, one or more networks 1710, and cloud computing system 1712. Cloud computing system 1712 is configured to provide resources and data to client devices 1702-1708 via networks 1710. In some embodiments, cloud computing system 1700 provides resources to any number of different users (e.g., customers, tenants, organizations, etc.). Cloud computing system 1712 may be implemented by one or more computer systems (e.g., servers), virtual machines operating on a computer system, or a combination thereof.

As shown, cloud computing system 1712 includes one or more applications 1714, one or more services 1716, and one or more databases 1718. Cloud computing system 1700 may provide applications 1714, services 1716, and databases 1718 to any number of different customers in a self-service, subscription-based, elastically scalable, reliable, highly available, and secure manner.

In some embodiments, cloud computing system 1700 may be adapted to automatically provision, manage, and track a customer's subscriptions to services offered by cloud computing system 1700. Cloud computing system 1700 may provide cloud services via different deployment models. For example, cloud services may be provided under a public cloud model in which cloud computing system 1700 is owned by an organization selling cloud services and the cloud services are made available to the general public or different industry enterprises. As another example, cloud services may be provided under a private cloud model in which cloud computing system 1700 is operated solely for a single organization and may provide cloud services for one or more entities within the organization. The cloud services may also be provided under a community cloud model in which cloud computing system 1700 and the cloud services provided by cloud computing system 1700 are shared by several organizations in a related community. The cloud services may also be provided under a hybrid cloud model, which is a combination of two or more of the aforementioned different models.

In some instances, any one of applications 1714, services 1716, and databases 1718 made available to client devices 1702-1708 via networks 1710 from cloud computing system 1700 is referred to as a "cloud service." Typically, servers and systems that make up cloud computing system 1700 are different from the on-premises servers and systems of a customer. For example, cloud computing system 1700 may host an application and a user of one of client devices 1702-1708 may order and use the application via networks 1710.

Applications 1714 may include software applications that are configured to execute on cloud computing system 1712 (e.g., a computer system or a virtual machine operating on a computer system) and be accessed, controlled, managed, etc. via client devices 1702-1708. In some embodiments, applications 1714 may include server applications and/or mid-tier applications (e.g., HTTP (hypertext transport protocol) server applications, FTP (file transfer protocol) server applications, CGI (common gateway interface) server applications, JAVA server applications, etc.). Services 1716 are software components, modules, application, etc. that are configured to execute on cloud computing system 1712 and provide functionalities to client devices 1702-1708 via networks 1710. Services 1716 may be web-based services or on-demand cloud services.

Databases 1718 are configured to store and/or manage data that is accessed by applications 1714, services 1716, and/or client devices 1702-1708. For instance, storages 150 and 155 may be stored in databases 1718. Databases 1718 may reside on a non-transitory storage medium local to (and/or resident in) cloud computing system 1212, in a storage-area network (SAN), on a non-transitory storage medium local located remotely from cloud computing system 1712. In some embodiments, databases 1718 may include relational databases that are managed by a relational database management system (RDBMS). Databases 1718 may be a column-oriented databases, row-oriented databases, or a combination thereof. In some embodiments, some or all of databases 1718 are in-memory databases. That is, in some such embodiments, data for databases 1718 are stored and managed in memory (e.g., random access memory (RAM)).

Client devices 1702-1708 are configured to execute and operate a client application (e.g., a web browser, a proprietary client application, etc.) that communicates with applications 1714, services 1716, and/or databases 1718 via networks 1710. This way, client devices 1702-1708 may access the various functionalities provided by applications 1714, services 1716, and databases 1718 while applications 1714, services 1716, and databases 1718 are operating (e.g., hosted) on cloud computing system 1700. Client devices 1702-1708 may be computer system 1500 or computing device 1600, as described above by reference to FIGS. 15 and 16, respectively. Although system 1700 is shown with four client devices, any number of client devices may be supported.

Networks 1710 may be any type of network configured to facilitate data communications among client devices 1702-1708 and cloud computing system 1712 using any of a variety of network protocols. Networks 1710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a first computing system, the program comprising sets of instructions for:
    sending a second computing system a spatial filter and a first query for a set of geo-enriched data associated with a spatial visualization, wherein each geo-enriched data in the set of geo-enriched data comprises spatial data, location data, and non-location data, wherein the spatial filter specifies a first set of geographical regions;
    sending the second computing system the spatial filter and a second query for the set of geo-enriched data associated with a non-spatial visualization;
    receiving, from the second computing system, a first subset of the set of geo-enriched data, wherein the spatial data associated with each geo-enriched data in the first subset of the set of geo-enriched data is within the first set of geographical regions of the spatial filter;
    receiving, from the second computing system, a second subset of the set of geo-enriched data, wherein the spatial data associated with each geo-enriched data in the second subset of the set of geo-enriched data is within the first set of geographical regions of the spatial filter;
    generating the spatial visualization to include the spatial data and the location data associated with the first subset of the set of geo-enriched data;
    generating the non-spatial visualization to include the non-location data associated with the second subset of the set of geo-enriched data;
    receiving a modification to the spatial filter, wherein the modified spatial filter specifies a second set of geographical regions;
    in response to the modification:
        sending the second computing system the modified spatial filter and the first query for the set of geo-enriched data associated with the spatial visualization;
        sending the second computing system the modified spatial filter and the second query for the set of geo-enriched data associated with the non-spatial visualization;
        receiving, from the second computing system, a third subset of the set of geo-enriched data, wherein the spatial data associated with each geo-enriched data in the third subset of the set of geo-enriched data is within the second set of geographical regions of the modified spatial filter;
        receiving, from the second computing system, a fourth subset of the set of geo-enriched data, wherein the spatial data associated with each geo-enriched data in the fourth subset of the set of geo-enriched data is within the second set of geographical regions of the modified spatial filter;
        generating the spatial visualization to include the spatial data and the location data associated with the third subset of the set of geo-enriched data; and
        generating the non-spatial visualization to include the non-location data associated with the fourth subset of the set of geo-enriched data.

2. The non-transitory machine-readable medium of claim 1, wherein the program further comprises sets of instructions for displaying the spatial visualization and the non-spatial visualization on a display of the first computing system.

3. The non-transitory machine-readable medium of claim 1, wherein the spatial filter specifies a geometry of a geographical element in the spatial visualization.

4. The non-transitory machine-readable medium of claim 1, wherein the spatial visualization includes a tool for specifying a geometry in the spatial visualization, wherein the spatial filter specifies the geometry in the spatial visualization defined via the tool.

5. The non-transitory machine-readable medium of claim 1, wherein the spatial visualization includes a set of geographical elements, wherein the spatial filter specifies a distance filter that filters for geo-enriched data that is within a defined distance to the set of geographical elements in the spatial visualization.

6. The non-transitory machine-readable medium of claim 1, wherein the spatial filter is a first spatial filter, wherein sending the second computing system the spatial filter and the first query comprises sending the second computing system the first spatial filter, a second spatial filter, and the first query, wherein sending the second computing system the spatial filter and the second query comprises sending the second computing system the first spatial filter, the second spatial filter, and the second query.

7. The non-transitory machine-readable medium of claim 6, wherein the spatial data associated with each geo-enriched data in the first subset of the set of geo-enriched data is within the first spatial filter and the second spatial filter.

8. For a method performed by a first computing system, the method comprising:
    sending a second computing system a spatial filter and a first query for a set of geo-enriched data associated with a spatial visualization, wherein each geo-enriched data in the set of geo-enriched data comprises spatial data, location data, and non-location data, wherein the spatial filter specifies a first set of geographical regions;

sending the second computing system the spatial filter and a second query for the set of geo-enriched data associated with a non-spatial visualization;

receiving, from the second computing system, a first subset of the set of geo-enriched data, wherein the spatial data associated with each geo-enriched data in the first subset of the set of geo-enriched data is within the first set of geographical regions of the spatial filter;

receiving, from the second computing system, a second subset of the set of geo-enriched data, wherein the spatial data associated with each geo-enriched data in the second subset of the set of geo-enriched data is within the first set of geographical regions of the spatial filter;

generating the spatial visualization to include the spatial data and the location data associated with the first subset of the set of geo-enriched data;

generating the non-spatial visualization to include the non-location data associated with the second subset of the set of geo-enriched data;

receiving a modification to the spatial filter, wherein the modified spatial filter specifies a second set of geographical regions;

in response to the modification:
sending the second computing system the modified spatial filter and the first query for the set of geo-enriched data associated with the spatial visualization;

sending the second computing system the modified spatial filter and the second query for the set of geo-enriched data associated with the non-spatial visualization;

receiving, from the second computing system, a third subset of the set of geo-enriched data, wherein the spatial data associated with each geo-enriched data in the third subset of the set of geo-enriched data is within the second set of geographical regions of the modified spatial filter;

receiving, from the second computing system, a fourth subset of the set of geo-enriched data, wherein the spatial data associated with each geo-enriched data in the fourth subset of the set of geo-enriched data is within the second set of geographical regions of the modified spatial filter;

generating the spatial visualization to include the spatial data and the location data associated with the third subset of the set of geo-enriched data; and generating the non-spatial visualization to include the non-location data associated with the fourth subset of the set of geo-enriched data.

9. The method of claim 8 further comprising displaying the spatial visualization and the non-spatial visualization on a display of the first computing system.

10. The method of claim 8, wherein the spatial filter specifies a geometry of a geographical element in the spatial visualization.

11. The method of claim 8, wherein the spatial visualization includes a tool for specifying a geometry in the spatial visualization, wherein the spatial filter specifies the geometry in the spatial visualization defined via the tool.

12. The method of claim 8, wherein the spatial visualization includes a set of geographical elements, wherein the spatial filter specifies a distance filter that filters for geo-enriched data that is within a defined distance to the set of geographical elements in the spatial visualization.

13. The method of claim 8, wherein the spatial filter is a first spatial filter, wherein sending the second computing system the spatial filter and the first query comprises sending the second computing system the first spatial filter, a second spatial filter, and the first query, wherein sending the second computing system the spatial filter and the second query comprises sending the second computing system the first spatial filter, the second spatial filter, and the second query.

14. The method of claim 13, wherein the spatial data associated with each geo-enriched data in the first subset of the set of geo-enriched data is within the first spatial filter and the second spatial filter.

15. A system comprising:
a set of processing units; and
a non-transitory computer-readable medium storing instructions that when executed by at least one processing unit in the set of processing units cause the at least one processing unit to:

send a computing system a spatial filter and a first query for a set of geo-enriched data associated with a spatial visualization, wherein each geo-enriched data in the set of geo-enriched data comprises spatial data, location data, and non-location data, wherein the spatial filter specifies a first set of geographical regions;

send the computing system the spatial filter and a second query for the set of geo-enriched data associated with a non-spatial visualization;

receive, from the computing system, a first subset of the set of geo-enriched data, wherein the spatial data associated with each geo-enriched data in the first subset of the set of geo-enriched data is within the first set of geographical regions of the spatial filter;

receive, from the computing system, a second subset of the set of geo-enriched data, wherein the spatial data associated with each geo-enriched data in the second subset of the set of geo-enriched data is within the first set of geographical regions of the spatial filter;

generate the spatial visualization to include the spatial data and the location data associated with the first subset of the set of geo-enriched data; and generate the non-spatial visualization to include the non-location data associated with the second subset of the set of geo-enriched data; and receive a modification to the spatial filter, wherein the modified spatial filter specifies a second set of geographical regions;

in response to the modification:
send the second computing system the modified spatial filter and the first query for the set of geo-enriched data associated with the spatial visualization;

send the second computing system the modified spatial filter and the second query for the set of geo-enriched data associated with the non-spatial visualization;

receive, from the second computing system, a third subset of the set of geo-enriched data, wherein the spatial data associated with each geo-enriched data in the third subset of the set of geo-enriched data is within the second set of geographical regions of the modified spatial filter;

receive, from the second computing system, a fourth subset of the set of geo-enriched data, wherein the spatial data associated with each geo-enriched data in the fourth subset of the set of geo-enriched data is within the second set of geographical regions of the modified spatial filter;

generate the spatial visualization to include the spatial data and the location data associated with the third subset of the set of geo-enriched data; and generate the non-spatial visualization to include the non-location data associated with the fourth subset of the set of geo-enriched data.

16. The system of claim 15, wherein the instructions further cause the at least one processing unit to display the spatial visualization and the non-spatial visualization on a display of the system.

17. The system of claim 15, wherein the spatial filter comprises a geometry of a geographical element in the spatial visualization.

18. The system of claim 15, wherein the spatial visualization includes a tool for specifying a geometry in the spatial visualization, wherein the spatial filter comprises the geometry in the spatial visualization defined via the tool.

19. The system of claim 15, wherein the spatial visualization includes a set of geographical elements, wherein the spatial filter specifies a distance filter that filters for geo-enriched data that is within a defined distance to the set of geographical elements in the spatial visualization.

20. The system of claim 15, wherein the spatial filter is a first spatial filter, wherein sending the second computing system the spatial filter and the first query comprises sending the second computing system the first spatial filter, a second spatial filter, and the first query, wherein sending the second computing system the spatial filter and the second query comprises sending the second computing system the first spatial filter, the second spatial filter, and the second query.

\* \* \* \* \*